United States Patent [19]

Makowski et al.

[11] 4,118,353

[45] Oct. 3, 1978

[54] ELASTOMERIC COMPOSITIONS

[75] Inventors: Henry S. Makowski, Scotch Plains; Charles P. O'Farrell, Clark, both of N.J.

[73] Assignee: Exxon Research & Engineering Co., Linden, N.J.

[21] Appl. No.: 855,545

[22] Filed: Nov. 29, 1977

[51] Int. Cl.$^2$ .............................................. C08L 91/00
[52] U.S. Cl. .......................... 260/28.5 B; 260/31.2 R; 260/33.6 AQ; 260/42.33; 260/42.47
[58] Field of Search ................. 260/79.3 R, 33.6 AQ, 260/889, 42.33, 31.2, 42.47, 28.5 B

[56] References Cited
U.S. PATENT DOCUMENTS 4,007,149    2/1977    Burton et al. .................... 260/29.7 B Primary Examiner—Lewis T. Jacobs
Attorney, Agent, or Firm—Richard E. Nanfeldt

[57] ABSTRACT

This invention relates to moldable or extrudable type elastomeric compositions having a viscosity at 200° C at 0.73 sec$^{-1}$ of about less than about $10^5$ poise. The compositions used for elastomeric articles include 100 parts of a neutralized sulfonated EPDM terpolymer; about 25 to about 150 parts per hundred of a non-polar process oil; about 25 to about 200 parts per hundred of a filler; and about 2 to about 50 parts of a hydroxyalkyl carboxylate ester.

These blend compositions can be readily processed due to their superior rheological properties on conventional plastic fabrication equipment into elastomeric articles having excellent physical properties and desirable rubbery characteristics.

23 Claims, No Drawings

ELASTOMERIC COMPOSITIONS

BACKGROUND OF THE INVENTION

1. Field of the Invention

This invention relates to injection moldable or extrudable type elastomeric compositions having a viscosity at 200° C. at 0.73 sec$^{-1}$ of about less than $10^5$ poise. The compositions used for elastomeric articles include 100 parts of a neutralized sulfonated EPDM terpolymer; about 25 to about 150 parts per hundred of a nonpolar process oil; about 25 to about 200 parts per hundred of a filler; and about 2 to about 50 parts of a hydroxyalkyl carboxylate ester.

These blend compositions can be readily processed due to their superior rheological properties on conventional plastic fabrication equipment into elastomeric articles having excellent physical properties and desirable rubbery characteristics.

The hydroxyalkyl esters of this invention may be schematically represented as follows:

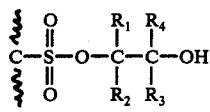

wherein ～C～ is one or more carbon atoms in one or more molecules comprising a polymer and is in the polymer backbone-chain of carbon atoms or is in an acyclic, alicyclic, or aromatic group which is pendant to the backbone chain; $R_1$, $R_2$, $R_3$ and $R_4$ are independently selected from the group consisting of hydrogen, $C_1$ to $C_{18}$ straight and branched chain acyclic, alicyclic, aryl, alkylaryl, arylalkyl groups and functional derivatives thereof.

Products which have a limited concentration of ionic groups covalently bonded to one or more carbon atoms of one or more molecules comprising a polymer, when partially or completely neutralized with mono or polyvalent cations such as sodium, zinc, magnesium, lead, ammonium and quaternary ammonium compounds are generally referred to as ionomers. The ionic groups can be covalently bonded to carbon atoms comprising the backbone chain of the polymer, which chain of carbon atoms may be interrupted by hetero atoms such as oxygen, nitrogen and sulfur, or the ionic groups can be bonded to acyclic, alicyclic or aromatic groups which are pendant to the backbone chain. Ionomers differ from covalently cross-linked elastomers, such as vulcanized rubber, in that while ionomers can be elastomeric at ordinary temperatures, at elevated temperatures, they can be extruded, compression molded, blow molded, sheeted, vacuum formed and injection molded.

Sulfonated polymers i.e. those containing free sulfonic acid are known to be relatively unstable and are difficult to process in safety or without degradation in conventional plastic or rubber equipment at elevated temperatures. Except for this tendency to degrade it would be advantageous to process the free acid since the relatively weak ionic associations among the acid groups result in a low polymer viscosity permitting easy mixing with neutralizing agents, extender oils, plasticizers, fillers and other polymers. Such filled and extended systems can then be reacted with the neutralizing agent such as metallic oxides, hydroxides and alkoxides or salts of a weak acid such as an acetate or stearate to yield the ionomer.

On the other hand, if the sulfonated polymer is first neutralized with a counterion and the ionomeric product isolated, it is found to possess an extraordinarily high viscosity even at elevated temperatures commonly used for processing thermoplastic polymers in conventional equipment and must be mixed with other materials by solution techniques.

A major object of this invention is the preparation of low viscosity, thermally and hydrolytically stable esters of sulfonated polymers which are readily convertible to ionomers by reaction with a basic substance. A further object of this invention is the preparation of extended ionomer compositions which comprises reacting a polymer having one or more sulfonic acid groups covalently linked or bonded to one or more carbon atoms in one or more molecules comprising said polymer with an oxirane to form a hydroxyalkyl ester, mixing the hydroxyalkyl ester with fillers and oils, and then reacting the ester with a basic substance selected from the group consisting of mono and polyvalent metallic oxides, hydroxides, alkoxides and salts of acids having a lower $K_a$ than the sulfonic acid. These, and other objects of this invention, will be further apparent in the detailed description of the invention which follows below.

2. Description of the Prior Art

The reaction of an oxirane (e.g. ethylene oxide) with a sulfonic acid to form a hydroxyethyl ester is old in the art. U.S. Pat. No. 2,208,581 discloses the preparation of surface active agents by the reaction of low molecular weight sulfonic acids with a compound containing an olefin oxide.

In a first copending application concerning preparation of ionomeric latex epoxides are used to quench the sulfonation reaction and allow the cement to be processable in a unique latex process. However, this copending application fails to teach a method for the isolation of a solid, gel-free, hydrolytically stable polymeric hydroxyalkyl sulfonate having desirable physical and rheological properties, wherein these polymeric sulfonates are readily convertible to metal sulfonates during and after processing thereby permitting fabrication on conventional plastic type equipment to a variety of useful articles. Furthermore, it is completely unpredictable that a solid, gel-free, hydrolytically stable polymeric hydroxyalkyl sulfonate is capable of being isolated in a steam stripping operation under acidic conditions and at higher temperatures based upon the published literature on the hydrolytic stability of low molecular weight alkyl sulfonates. No references have been found in the chemical or patent literature for the preparation of hydroxyalkyl esters of polymeric sulfonic acids or for the preparation of ionomers from these esters by reaction with a basic compound or salt of an acid having a lower $K_a$ than the sulfonic acid.

In another copending application Ser. No. 855,765, filed Nov. 29, 1977 entitled "Polymeric Hydroxyalkyl Sulfonates", herein incorporated by reference, the preparation of polymeric hydroxyalkyl sulfonates are described wherein an acid form of a sulfonated polymer is reacted with an oxirane having the general formula:

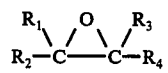

wherein $R_1$, $R_2$, $R_3$ and $R_4$ are independently selected from the group consisting of hydrogen and $C_1$ to $C_{18}$ straight and branched chain acyclic, alicyclic, aryl, alkylaryl, arylalkyl radicals and functional derivatives thereof. The improved blend compositions of the present instant invention provide materials of superior physical and rheological properties.

SUMMARY OF THE INVENTION

It has been found surprisingly that compositions formed from blends of neutralized sulfonated elastomeric materials in particular a select class of neutralized sulfonated elastomeric polymers, inorganic fillers, carbon blacks, non-polar process oils and a hydroxyalkyl carboxylate ester have suitable rheological and physical properties for the formation of elastomeric articles, by an extrusion or injection molding process.

Accordingly, it is an object of our present invention to provide unique and novel compositions of matter for producing high performance elastomeric articles by an extrusion or injection molding process, wherein the compositions of the elastomeric article have a viscosity of 0.73 sec$^{-1}$ at 200° C. of less than about 10$^5$ poise which corresponds to a melt index at 190° C. and 250 psi of about 4 grams/10 minutes and a Shore A Hardness of about 45 to about 75.

It is the object of the instant invention to describe a class of compounds based on sulfonated ethylene-propylene terpolymers which can be processed on plastics type extrusion equipment at high rates and which possess improved physical characteristics such as low temperature flexibility and rubbery feel. One of the essential aspects of the present invention comprises the discovery that only a restricted class of the subject sulfonated elastomers may be readily employed for extrusion fabrication. The restrictions are primarily associated with processing and product performance characteristics. These characteristics are to a degree modulated by the type and concentration of various compounding ingredients. The compositions of the instant invention will, therefore, involve a class of compositions based on a restrictive class of sulfonated elastomers.

A substantial segment of the plastics and rubber fabrication industry employs a fabrication technique known as extrusion to form articles which can be classified as sheet, profiles, tubing and film. The applications employing these fabrication techniques such as windshield wipers, weather stripping, refrigerator door seals, garden hose, etc. require materials which are flexible and tough. Two broad classifications of materials which have been used are vulcanized elastomers and plasticized thermoplastics such as polyvinyl chloride (PVC). The fabrication of extrusion articles based on vulcanized elastomers is a major item of cost involving the vulcanization procedure. Not only is this step costly from an energy intensive viewpoint, but it is time consuming. The use of plasticating extrusion for thermoplastic materials is more economical and results in high extrusion rates for materials such as plasticized PVC. While these materials possess a degree of flexibility, they do not have a good rubbery feel or good low temperature flexibility. It is therefore desirable to have materials which can be processed on plastics type extrusion equipment at conventional plastics rates and which possess the flexibility and subjective rubbery characteristics of vulcanized elastomers.

GENERAL DESCRIPTION

This present invention relates to unique and novel blend compositions of a neutralized sulfonated elastomeric polymer, an inorganic filler or a carbon black or both, a non-polar process oil, and a hydroxyalkyl carboxylate ester wherein the resultant composition has a viscosity at 0.73 sec$^{-1}$ at 200° C. of about less that 10$^5$ poise or a melt index equal to or greater than about 4 grams/10 minutes wherein the compositions are readily processable in a conventional extrusion or injection molding process into a high performance elastomeric article such as a garden hose. The resultant elastomeric article has excellent low and elevated temperature flexibility, excellent flex fatigue, superior dimensional stability, good resilience, and a rubber-like feel.

The neutralized sulfonated elastomeric polymers of this present instant invention are derived from unsaturated polymers which include low unsaturated elastomeric polymers such as Butyl rubber, or EPDM terpolymers.

Alternatively, other unsaturated polymers are selected from the group consisting essentially of partially hydrogenated polyisoprenes, partially hydrogenated polybutadienes, Neoprene, styrene-butadiene copolymers of isoprene-styrene random copolymers.

The expression "Butyl rubber" as employed in the specification and claims is intended to inlude copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably, about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1 + 8, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt.% olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt.% ethylene and about 1 to about 10 wt.% of a diene monomer, the balance of the polymer being propylene. Preferably, the polymer contains about 45 to about 70 wt.% ethylene, e.g. 50 wt.% and about 2.6 to about 8.0 wt.% diene monomer, e.g. 5.0 wt.%. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1 + 8, 212° F.) of about 40 and having an ethylene content of about 50 wt.% and a 5-ethylidene-2-norbornene content of about 5.0 wt.%. The $\overline{Mn}$ of Vistalon 2504 is about 47,000, the $\overline{Mv}$ is about 145,000 and the $\overline{Mw}$ is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{Mn}$ of Vistalon 2504-20 is about 26,000, the $\overline{Mv}$ is about 90,000 and the $\overline{Mw}$ is about 125,000.

Nordel 1320 (DuPont) is another terpolymer having a Mooney viscosity at 212° F. of about 25 and having about 53 wt.% of ethylene, about 3.5 wt.% of 1,4-hexadiene, and about 43.5 wt.% of propylene.

The EPDM terpolymers of this invention have a number average molecular weight ($\overline{Mn}$) of about 10,000 to about 200,000, more preferably of about 15,000 to about 100,000, most preferably of about 20,000 to about 60,000. The Mooney viscosity (ML, 1 + 8, 212° F.) of the EPDM terpolymer is about 5 to about 60, more preferably about 10 to about 50, most preferably about 15 to about 40. The $\overline{Mv}$ of the EPDM terpolymer is preferably below about 350,000 and more preferably below about 300,000. The $\overline{Mw}$ of the EPDM terpolymer is preferably below about 500,000 and more preferably below about 350,000.

In carrying out the invention, the elastomeric polymer is dissolved in a non-reactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are SO$_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or chlorinated aromatic hydrocarbon or in the absence of a solvent.

The amount of desirable sulfonation depends on the particular application. Preferably, the elastomeric polymer is sulfonated at about 5 to about 60 meq. SO$_3$H/100g of polymer, more preferably at about 10 to about 50 meq. SO$_3$H/100 grams of polymer and most preferably at about 20 to about 40 meq. SO$_3$H/100 grams of polymer. The meq. of SO$_3$H/100 grams of polymer can be determined by dissolving the acid form of the sulfonated polymer in a mixed solvent of 95 part toluene and 5 parts methanol at a concentration level of 50 grams per liter of solvent. The acid form is titrated with sodium hydroxide in ethanol to an Alizarin Thymolphthalein endpoint. Dietert sulfur analysis and the acid titration agree with regard to combined sulfur when a sulfonation is conducted under proper and controlled conditions.

It should be pointed out that neither the sulfonating agent nor the manner of sulfonation is critical, provided that the sulfonating method does not degrade the polymer backbone.

The sulfonation reaction can be terminated and the sulfonated polymer converted to a hydroxyethyl ester by the addition of an oxirane to the reaction mixture, or the sulfonated polymer recovered by precipitation for example with a polar solvent such as methanol or acetone, and after removal of the polar solvent, redissolved in a non-reactive solvent and converted to the hydroxyalkyl ester by reaction with an oxirane, as described in a copending application Ser. No. 855,763, entitled "Polymeric Hydroxyalkyl Sulfonates" to H. S. Makowski and C. P. O'Farrell which was filed the same day as the instant application and is hereby incorporated by reference into the instant application.

Oxiranes which are suitable for the practice of this invention have the general formula:

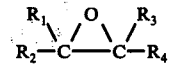

wherein R$_1$, R$_2$, R$_3$ and R$_4$ are independently selected from the group consisting of hydrogen and C$_1$ to C$_{18}$ straight and branched chain acyclic, alicyclic, aryl, alkylaryl, aryl-alkyl radicals and functional derivatives thereof. Non-limiting examples of suitable oxiranes include ethylene oxide, propylene oxide, allyl glycidyl ether, styrene oxide, epichlorohydrin and epoxidized methyl oleate.

Ethylene glycol, propylene glycol and their monomethyl or monoethyl ethers are useful as their mono sodium or potassium salts for the preparation of the hydroxyethyl esters from polymers which have been chlorosulfonated.

In accordance with this invention, polymers having sulfonic acid groups covalently linked to carbon atoms comprising the polymer can be reacted with an oxirane to yield hydroxyalkyl esters which are free of acid and can be isolated as for example by steam stripping or precipitation with a polar solvent and the product dried, mixed, and compounded and the hydroxyalkyl sulfonate partially or completely converted to the metal sulfonate to form an ionomer by mixing with a mono or polyvalent basic compound or salt of an acid having a lower $K_a$ than the sulfonic acid in conventional equipment without decomposition or corrosion. The hydroxyethyl esters are:
(1) Stable to hydrolysis under steam stripping conditions;
(2) Thermally stable at the temperatures used in processing thermoplastic and elastomeric materials;
(3) Convertible to an ionomer by mixing in bulk with a basic compound or salt of a weak acid, followed by the application of heat; and
(4) Permits the preparation of ionomers which are free of acid when less than the stoichiometric quantity, based on the sulfonic acid content, of a basic compound or salt is used to convert the ester to an ionomer.

The products and the process of this invention thus avoid all of the difficulties associated with working with the free acid or solution neutralized products.

The hydroxyalkyl sulfonates and the neutralized sulfonated elastomeric polymers are essentially gel-free. Gel is measured by stirring a given weight of the polymeric hydroxyalkyl sulfonate in a solvent comprised of 95 toluene/5 methanol at a concentration of 5 wt.% for 24 hours, allowing the mixture to settle, withdrawing a weighed sample of the supernatant solution and evaporating to dryness.

This process comprises dissolving the polymer at a concentration in the range of about 3 to about 25 wt.% in a non-reactive solvent, sulfonating the polymer to the desired degree with appropriate sulfonating agent, reacting the sulfonated polymer, either before isolation or after isolation and purification, in a solvent with an appropriate oxirane, separating the reaction product of the sulfonated polymer with the oxirane from the solvent and converting said reaction product to an ionomer by reaction with about 10 to more than 100% of the stoichiometric proportion of a metallic base or salt of an acid having a lower $K_a$ than the sulfonic acid, based on the sulfonic acid content of said sulfonated polymer, and recovering said ionomer.

The hydroxyalkyl sulfonated polymer is readily handled in drying extruders and conventional mixing equipment such as Banbury mixers and rubber mills. Compounding with extender oils, neutralizing agents, plasticizers, fillers, reinforcing agents, antioxidants and other polymers is readily accomplished in such mixing equipment and the conversion of the compounded stock to an ionomer is effected by the addition of bases such as mono and polyvalent metallic oxides, hydroxides and alkoxides, or salts or weak acids such as carboxylates, of which acetates, laurates and stearates are non-limiting examples. Preferred are metal salts of carboxylic acids.

When a metal carboxylate is used to neutralize the polymeric sulfonic acid, a carboxylic acid is released.

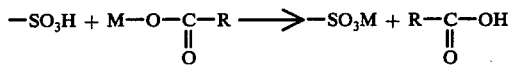

When the polymeric sulfonic acids are neutralized in bulk with the lower molecular weight metal carboxylates, the presence of the generated carboxylic acid, e.g. acetic acid, is undesirable because of odor and possible corrosion. The higher molecular weight carboxylic acids, such as stearic acid, are not odoriferous or corrosive. However, these higher molecular weight carboxylic acids, which are excellent flow improvers at elevated temperatures, also exert deleterious effects upon ionomer physical properties at lower temperatures and so are less desirable than other plasticizers.

The reaction between metal carboxylate and hydroxylalkyl sulfonate produces a mixture of the metal sulfonate and a hydroxylalkyl carboxylate ester in equivalent proportion for complete neutralization.

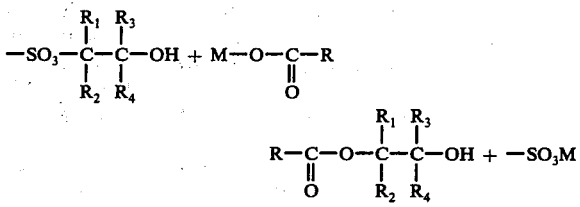

The lower molecular weight hydroxylalkyl carboxylates are not odoriferous or corrosive as the corresponding carboxylic acids. The higher molecular weight carboxylates are not as deleterious to physical properties as are the corresponding carboxylic acids.

The metals which are preferred for the formation of ionic crosslinks of the sulfonated polymer are selected from the group consisting of Groups I-A, II-A, I-B or II-B of the Periodic Table of Elements and lead, alumium, iron and antimony. Most preferred are bases and fatty acid salts of zinc, magnesium, barium, sodium and lead.

Fillers which can be used in the present invention are mineral fillers and carbon blacks. The mineral fillers employed are selected from talcs, ground calcium carbonate, water precipitated calcium carbonate, or delaminated, calcined, or hydrated clays and mixtures thereof. Typically, these mineral fillers have a particle size of about 0.03 to about 20 microns, more preferably about 0.3 to about 10, and most preferably about 0.5 to about 10. The oil absorption as measured by grams of oil absorbed by 100 grams of filler to about 10 to about 100, more preferably about 10 to about 85 and most preferably about 10 to about 75. Typical mineral fillers employed in this invention are illustrated in Table I.

Carbon blacks range widely in physical and chemical properties. Physically, they vary in average particle size, particle size distribution, specific surface area, porosity of surface, and the tendency of the individual primary particles to be associated in chain-like structure. Chemically they vary in the population and nature of oxygenated structures combined with their surface. Typical carbon blacks employed by this invention are illustrated in Table II.

These mineral and carbon black fillers are blended into the blend composition at about 5 to about 300 parts per hundred; more preferably at about 20 to about 250; and most preferably at about 25 to about 200.

TABLE I

| Filler | Code # | Oil Absorption grams of oil/100 grams of filler | Specific Gravity | Avg.Particle Size Micron | pH |
| --- | --- | --- | --- | --- | --- |
| Calcium carbonate ground | Atomite | 15 | 2.71 | | 9.3 |
| Calcium carbonate precipitated | Purecal U | 35 | 2.65 | .03–.04 | 9.3 |
| delaminated clay | Polyfil DL | 30 | 2.61 | 4.5 | 6.5–7.5 |

TABLE I-continued

| Filler | Code # | Oil Absorption grams of oil/100 grams of filler | Specific Gravity | Avg.Particle Size Micron | pH |
|---|---|---|---|---|---|
| hydrated clay | Suprex | | 2.6 | 2 | 4.0 |
| calcined clay | Icecap K | 50–55 | 2.63 | 1 | 5.0–6.0 |
| magnesium silicate (talc) | Mistron Vapor | 60–70 | 2.75 | 2 | 9.0–7.5 |

TABLE II

| Carbon Black | Type | Nigrometer Index | Sp.Surface Area, $m^2/g$. | EM Diameter (dn),A | Volatile % | pH | Total acids meq./g. |
|---|---|---|---|---|---|---|---|
| Black Pearls 46 | Channel | 65 | 800 | 130 | 14.0 | 3.0 | 2.42 |
| Black Pearls 74 | Channel | 74 | 332 | 170 | 5.0 | 5.0 | 0.95 |
| Spheron 9 | Channel | 85 | 105 | 290 | 5.0 | 5.0 | 0.94 |
| Vulcan 9 | Oil Furnace (SAF) | 86 | 124 | 200 | 1.5 | 8.5 | 0.84 |
| Vulcan 3 | Oil Furnace (HAF) | 90 | 74 | 290 | 1.0 | 8.5 | 0.68 |
| Regal 330 | Low Structure Oil Furnace | 84.5 | — | 240 | — | 8.5 | 0.42 |
| Sterling S | Gas Furnace | 99 | 23 | 800 | 1.0 | 9.5 | 0.68 |
| Sterling FT | Thermal (FT) | 107 | 13 | 1800 | 0.5 | 8.5 | 0.12 |
| Sterling MT | Thermal (MT) | 110 | 6 | 4700 | 0.5 | 8.5 | 0.10 |

The oils employed in the present invention are nonpolar process oils having less than about 6 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 SSU at 100° F. and a number average molecular weight of about 300 to about 1,000, and more preferably about 300 to 750. The preferred process oils are paraffinics. Table III illustrates typical oils encompassed by the scope of this invention.

The oils are incorporated into the blend composition at a concentration level of about 20 to about 200 parts per hundred; more preferably at about 20 to about 175, and most preferably at about 25 to about 150.

TABLE III

| Type Oil | Oil Code # | Viscosity SSU | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Aromatic | Sundex 790 | 3000 | — | 5.4 | 59.3 | 35.3 |
| Naphthenic | Sunthene 4240 | 2206 | — | 1.1 | 43.9 | 55.0 |

The filler to oil ratio in the present instant application should be about 0.2 to about 2, more preferably 0.5 to about 1.75, and most preferably about 0.75 to about 1.25.

Various other additives can be incorporated into the blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of about 0 to about 100 parts per hundred by weight based on 100 parts of sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methylacrylate, ethylacrylate, sodium acrylate, methylmethacrylate, ethylmethacrylate, methacrylic acid, sodium methacrylate, etc. The preferred polyolefins are selected from the group consisting of polymers of $C_2$ to $C_4$ alpha-olefins. Most preferably the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc. are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment as well as a means for improving the ionic bonding force between the sulfonate groups in the sulfonated elastomeric polymer. The zinc oxide is incorporated into the blend composition at a concentration level of about 0 to about 25 parts per hundred by weight based on 100 parts of sulfonated polymer, more preferably about 0 to about 15. Alternatively, a Rutile or Anatase titanium dioxide can be employed as a whitening pigment.

A lubricant can be employed in the blend composition at a concentration level of about 0 to about 20 parts per hundred based on 100 parts of the neutralized sulfonated elastomeric polymers, and more preferably about 0 to about 15. The lubricants of the present instant invention are non-polar paraffinic hydrocarbon waxes having a softening point of about 125° F. to about 220° F., more preferably 150° F. to 200° F., wherein the wax has a number average molecular weight of about 300 to about 4000, more preferably 300 to 3000, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

Additionally, mineral reinforcing fillers can be added as additives to the blends of sulfonated polymer, filler and oil, wherein the reinforcing filler is selected from the group consisting essentially of silica, or calcium silicate and mixtures therein. These reinforcing agents are generally characterized as having particle sizes below 0.1 microns and oil absorption above about 100. These reinforcing fillers are incorporated in the blend composition at about 0 to 50 parts per hundred based on 100 parts of sulfonated polymer, more preferably 0 to 25. The ratio of filler to reinforcing agent is at least about 1, more preferably about 2, most preferably about 3.

The ingredients incorporated into the blend compositions of the present invention, in conjunction with the type of elastomeric polymer, the degree of sulfonation, and the metal counterion of the neutralized sulfonated elastomeric polymer and the plasticizer give materials processable by extrusion or injection molding processes into elastomeric articles having the desirable physical and rheological properties. These combined physical properties and rheological processability characteristics were not previously obtainable in the aforementioned U.S. patents.

Conversion of the uncompounded or compounded hydroxyethyl sulfonate by means of a metallic base or carboxylate is readily accomplished at elevated temperature, for example 120° C. to 260° C., most preferably 150° C. to 200° C. These temperatures are obtainable in equipment used for processing plastic and elastomeric materials such as Banbury mixers and extruders. Ionomers made by the bulk neutralization of the hydroxyalkylated ester of the sulfonated polymer permits the formulation of compounds with excellent processability for extrusion, injection molding, vacuum forming, compression molding and similar operations. This invention also permits a polymer to be sulfonated at one site and shipped as the hydroxyalkyl ester in a stable, corrosion-free state to a formulator at another site who can then prepare a variety of ionomers best suited to a particular use.

The compounding of the additives with the polymeric hydroxyalkyl sulfonate can be done prior to the addition of the neutralizing agent, wherein the neutralizing agent is added subsequently to the blend of the additives and polymeric hydroxyalkyl sulfonate. Alternatively, the additives and neutralizing agent can be compounded with the polymeric hydroxyalkyl sulfonate at a temperature below about 100° C. After a homogeneous blend has been achieved, the temperature of compound is increased to a temperature of about 120° C. to about 260° C. in order to effect neutralization.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1

EPDM comprising 50 weight % of ethylene, 45 weight % of propylene and 5 weight % of 5-ethylidene-2-norbornene and having a Mooney viscosity (ML, 1 + 8, 212° F.) of about 20 was sulfonated as follows: to a well stirred solution of 500 grams of the polymer and 28.7 ml. of acetic anhydride in 5.0 liters of hexane was slowly added 10.5 ml. of concentrated sulfuric acid. The mixture was stirred at room temperature for 30 minutes, and the sulfonation reaction was terminated by the addition of 28.5 grams of allyl glycidyl ether. Some increase in the viscosity of the cement was noted.

The cement was stabilized by the addition of 2.5 grams of Antioxidant 2246, and the polymer was recovered by steam stripping, washing with water in a Waring blender and drying of the wet polymer crumb on a rubber mill at about 200° F. The product had an elemental sulfur content (Dietert sulfur analysis) of 0.96 weight % which is equivalent to 30.0 meq. of sulfonate per 100 grams of polymer.

The allyloxyhydroxypropyl ester of the sulfonated EPDM was easily compounded on a rubber mill with 3 times the stoichiometric amount (90 meq.) of the stearates of calcium, barium, aluminum, magnesium, lithium, zinc, lead and sodium. In addition, a carbon black formulation; an oil-carbon black formulation; and a mineral filler-oil formulation were readily compounded along with magnesium stearate. Conversion to the corresponding metal sulfonate ionomers was effected by heating in molds at 150° C. and 177° C. The formulations, molding conditions for the test pads and results obtained are given in Table IV.

TABLE IV

| Example Number | 1-A | 1-B | 1-C | 1-D | 1-E | 1-F | 1-G | 1-H | 1-I | 1-J | 1-K |
|---|---|---|---|---|---|---|---|---|---|---|---|
| 9 Formulation: | | | | | | | | | | | |
| Polymer | 100 | 100 | 100 | 100 | 100 | 100 | 100 | 100 | 100 | 100 | 100 |
| Calcium Stearate | 27.5 | — | — | — | — | — | — | — | — | — | — |
| Barium Stearate | — | 31.5 | — | — | — | — | — | — | — | — | — |
| Aluminum Stearate | — | — | 26.5 | — | — | — | — | — | — | — | — |
| Magnesium Stearate | — | — | — | 26.5 | — | — | — | — | 26.5 | 26.5 | 26.5 |
| Lithium Stearate | — | — | — | — | 26.0 | — | — | — | — | — | — |
| Zinc Stearate | — | — | — | — | — | 28.5 | — | — | — | — | — |
| Lead Stearate | — | — | — | — | — | — | 35.0 | — | — | — | — |
| Sodium Stearate | — | — | — | — | — | — | — | 27.5 | — | — | — |
| Sunpar 180 | — | — | — | — | — | — | — | — | 100 | — | 60 |
| Pelletex NS[1] | — | — | — | — | — | — | — | — | 75 | 50 | — |
| Philblack A[2] | — | — | — | — | — | — | — | — | 75 | — | — |

TABLE IV-continued

| Example Number | 1-A | 1-B | 1-C | 1-D | 1-E | 1-F | 1-G | 1-H | 1-I | 1-J | 1-K |
|---|---|---|---|---|---|---|---|---|---|---|---|
| Purecal U | — | — | — | — | — | — | — | — | — | — | 120 |
| Molded 15 min. at 150° C. | | | | | | | | | | | |
| 300% Modulus, psi | 170 | 310 | 95 | 340 | 70 | 170 | 470 | 240 | 600 | 1240 | 230 |
| Tensile Strength, psi | 830 | 1260 | 270 | 1710 | 220 | 895 | 1880 | 350 | 630 | 1840 | 290 |
| Elongation, % | 710 | 600 | >1500 | 670 | >1400 | 870 | 520 | 545 | 340 | 460 | 550 |
| Molded 20 min. at 177° C. | | | | | | | | | | | |
| 300% Modulus, psi | 188 | 220 | 140 | 380 | 130 | 300 | 590 | 310 | 560 | 920 | 330 |
| Tensile Strength, psi | 1500 | 1820 | 760 | 3490 | 580 | 2310 | 4390 | 1470 | 900 | 2650 | 680 |
| Elongation, % | 630 | 590 | 920 | 625 | 770 | 550 | 505 | 580 | 250 | 440 | 450 |

[1]Pelletex NS is a semireinforcing furnace Black (SRF).
[2]Philblack A is a high abrasion furnace Black (HAF).

EXAMPLE 2

A sulfonation was effected as described in Example 1. Termination, however, was with an equivalent amount of propylene oxide. After stabilization, work-up and drying the product analyzed for 1.07 weight % sulfur. This corresponds to 33.4 meq. sulfonate/100 grams polymer.

The polymeric hydroxypropyl sulfonate was compounded in a 70 cc Brabender extrusion mixing head according to the formulations shown in Table V. Mixing was accomplished at 145° C. First the fillers and oil were mixed followed by the polymeric hydroxypropyl sulfonate and finally by the metal stearate. The mixed formulations were finished and sheeted out on a 3-inch electrically heated mill at 145° C.

The formulations were molded 30 minutes at 350° F. Tensile properties at room temperature, melt index at 190° C., and Shore A hardness were determined on the molded specimens. Results are given in Table V.

EXAMPLE 3

Again a sulfonation was effected as described in Example 1. However, this time termination was with an equivalent amount of epichlorohydrin. After stabilization, work-up and drying the product had a sulfur content of 1.11 weight percent which corresponds to a sulfonate content of 34.7 meq./100 grams polymer.

The polymeric chlorohydroxypropyl sulfonate was compounded as described in Example 2 according to the formulations shown in Table VI. After molding 30 minutes at 350° F. tensile properties, melt index, and hardness were determined. Results are given in Table VI.

TABLE V

| Example Number | 2-A | 2-B | 2-C |
|---|---|---|---|
| Formulation: | | | |
| Polymer (Example 2) | 100 | 100 | 100 |
| Sunpar 2280 | 85 | — | — |
| Sunpar 180 | — | 150 | — |
| Sunthene 4240 | — | — | 150 |
| Purecal U | 40 | — | — |
| Atomite | — | 150 | — |
| MT Black | — | — | 200 |
| Paraffin Wax (F3504) | 15 | — | — |
| Zinc Oxide | 25 | — | — |
| Magnesium Stearate | 26.5 | 26.5 | — |
| Barium Stearate | — | — | 31.5 |
| Properties: | | | |
| 300% Modulus, psi | 340 | 200 | 100 |
| Tensile Strength, psi | 895 | 430 | 350 |
| Elongation, % | 730 | 800 | 950 |
| Melt Index (190° C.), g/10 minutes | | | |
| at 43 psi | 0.24 | 2.0 | 0.08 |
| at 250 psi | 6.3 | 67.0 | 3.4 |
| Shore A hardness | 55 | 48 | 46 |

TABLE VI

| Example Number | 3-A | 3-B | 3-C |
|---|---|---|---|
| Formulation: | | | |
| Polymer (Example 3) | 100 | 100 | 100 |
| Sunpar 2280 | — | 50 | — |
| Sunpar 180 | 100 | — | — |
| Sundex 790 | — | — | 25 |
| Atomite | 100 | 80 | — |
| Mistron Vapor | — | 15 | — |
| Silene D | — | — | 5 |
| EPC Black (Spheron 9) | — | — | 10 |
| Zinc Oxide | — | 15 | 5 |
| LD-610 Polyethylene | — | 25 | — |
| Magnesium Stearate | 26.5 | — | — |
| Zinc Stearate | — | 26 | 26 |
| Properties: | | | |
| 300% Modulus, psi | 250 | 410 | 620 |
| Tensile Strength, psi | 640 | 570 | 1120 |
| Elongation, % | 770 | 405 | 470 |
| Melt Index (190° C.) g/10 minutes | | | |
| at 43 psi | 0.93 | 3.2 | 0.65 |
| at 250 psi | 24.5 | — | 15.7 |
| Shore A Hardness | 53 | 68 | 70 |

Since many modifications and variations of this invention may be made without departing from the spirit or scope of the invention thereof, it is not intended to limit the spirit or scope thereof to the specific examples thereof.

What is claimed is:

1. An elastomeric composition having a viscosity at 0.73 sec$^{-1}$ at 200° C. of about less than about 10$^5$ poise, said composition formable into an elastomeric article which comprises:
   (a) 100 parts by weight of a neutralized sulfonated elastomeric polymer having about 10 to about 50 meq. metal neutralized sulfonate groups per 100 grams of said sulfonated elastomeric polymer, a metal counterion of said metal sulfonated groups being selected from the group consisting essentially of antimony, iron, aluminum, lead, Groups I-A, II-A, I-B, II-B of the Periodic Table of Elements and mixtures thereof;
   (b) about 25 to about 150 parts per hundred of a nonpolar process oil;
   (c) about 25 to about 200 parts per hundred of a filler; and
   (d) about 2 to about 50 parts per hundred of a hydroxyl alkyl carboxylate ester.

2. A composition according to claim 1, wherein said neutralized sulfonated elastomeric polymer is formed from an elastomeric polymer selected from the group consisting essentially of butyl rubber and an EPDM terpolymer.

3. A composition according to claim 2, wherein said EPDM terpolymer consists essentially of about 40 to about 75 wt. % of ethylene, of about 10 to about 53 wt. % of propylene and of about 2 to about 10 wt. % of a non-conjugated diene.

4. A composition according to claim 3, wherein said non-conjugated diene is selected from the group consisting essentially of 1,4-hexadiene, dicyclopentadiene, 5-alkylidene-2-norbornenes, 5-alkenyl-2-norbornenes and tetrahydroindenes.

5. A composition according to claim 4, wherein said non-conjugated diene is 5-ethylidene-2-norbornene.

6. A composition according to claim 1 wherein said filler is chosen from non-reinforcing inorganic fillers and carbon blacks.

7. A composition according to claim 1, wherein a ratio of said filler to said oil is from about 0.2 to about 2.0.

8. A composition according to claim 1, having a Shore A Hardness of about 45 to about 75.

9. A composition according to claim 1, wherein said hydroxyalkyl carboxylate ester has the formula:

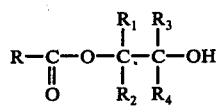

wherein $R_1$, $R_2$, $R_3$ and $R_4$ are independently selected from the group consisting of hydrogen, $C_1$ to $C_{18}$ straight and branched chain acyclic, alicyclic, aryl, alkylaryl, and arylalkyl groups and functional derivatives thereof and mixtures thereof.

10. A composition according to claim 1, further including an amorphous polypropylene.

11. A composition according to claim 1, further including a mineral reinforcing filler at a concentration level of about less than 50 parts per hundred.

12. A composition according to claim 1, wherein said filler has a particle size of about 0.03 to about 20 microns.

13. A composition according to claim 1, wherein said filler has an oil absorption of about 10 to about 100.

14. A composition according to claim 6, wherein said inorganic filler is selected from the group consisting essentially of clay, talc, and calcium carbonate and mixtures thereof.

15. A composition according to claim 1, wherein said non-polar process oil is selected from the group consisting essentially of paraffinics, naphthenics, aromatics and mixtures thereof.

16. A composition according to claim 1, wherein said non-polar process oil is paraffinic having an Mn of about 300 to about 1000.

17. A composition according to claim 1, further including a crystalline polyolefinic thermoplastic.

18. A composition according to claim 17, wherein said polyolefinic thermoplastic is added at a concentration level of less than about 100 parts per hundred.

19. A composition according to claim 18, wherein said polyolefinic thermoplastic has an $\overline{M}n$ of about at least 2,000.

20. A composition according to claim 1, further including a metallic oxide at a concentration level of less than about 25 parts per hundred.

21. A composition according to claim 20, wherein said metal oxide is zinc oxide.

22. A composition of claim 1, further including a lubricant.

23. A composition of claim 22, wherein said lubricant is a crystalline hydrocarbon wax having a melting point of about 135° F. to about 220° F. and an $\overline{M}n$ of about 300 to about 4000.

* * * * *